US010409740B2

(12) United States Patent
Hagiwara et al.

(10) Patent No.: US 10,409,740 B2
(45) Date of Patent: *Sep. 10, 2019

(54) SYSTEM FOR CHANGING RULES FOR DATA PIPLEINE READING USING TRIGGER DATA FROM ONE OR MORE DATA CONNECTION MODULES

(71) Applicant: International Business Machines Corporation, Armonk, NY (US)

(72) Inventors: Katsuhiko Hagiwara, Yamato (JP);
Yusuke Nishitani, Tokyo (JP);
Munetaka Ohtani, Kanagawa (JP);
Yutaka Oishi, Kanagawa (JP);
Yoshinori Tahara, Kanagawa (JP);
Terue Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,780

(22) Filed: Nov. 28, 2017

(65) Prior Publication Data
US 2018/0143920 A1 May 24, 2018

Related U.S. Application Data

(63) Continuation of application No. 15/355,417, filed on Nov. 18, 2016.

(51) Int. Cl.
*G06F 13/16* (2006.01)
*G06F 13/40* (2006.01)
(52) U.S. Cl.
CPC ...... *G06F 13/1668* (2013.01); *G06F 13/4068* (2013.01)

(58) Field of Classification Search
CPC .............................. G06F 9/54; G06F 13/1668
See application file for complete search history.

(56) References Cited

U.S. PATENT DOCUMENTS

| | | | | |
|---|---|---|---|---|
| 5,787,300 A | * | 7/1998 | Wijaya | G06F 9/544 370/282 |
| 6,092,166 A | * | 7/2000 | Bobak | G06F 9/544 709/200 |

(Continued)

FOREIGN PATENT DOCUMENTS

CN 103176856 * 6/2013 .............. G06F 9/54

OTHER PUBLICATIONS

Katsuhiko Hagiwara et al., "Method of Changing Rules for Data Pipeline Reading Using Trigger Data", Related Application, U.S. Appl. No. 15/355,417, filed Nov. 18, 2016.

(Continued)

*Primary Examiner* — Tammara R Peyton
(74) *Attorney, Agent, or Firm* — Cantor Colburn LLP; Ingrid M Foerster

(57) ABSTRACT

Provided is an operating method of a system including a first data processing module, a second data processing module, and one or more data connection modules that transfer data between the first data processing module and the second data processing module. In an operational state where the first data processing module and the second data processing module can process data input thereto, the first data processing module inputs trigger data to any of the one or more data connection modules, and in response to the second data processing module receiving the trigger data via the one or more data connection modules, the second data processing module changes a reading rule for reading data from the one or more data connection modules. Also provided are a system and a computer program product.

9 Claims, 10 Drawing Sheets

(56) References Cited

U.S. PATENT DOCUMENTS

| | | | |
|---|---|---|---|
| 6,990,570 B2* | 1/2006 | Masse | G06F 5/01 |
| | | | 712/232 |
| 7,653,805 B2* | 1/2010 | Yoshikawa | G06F 15/7867 |
| | | | 712/18 |
| 9,529,599 B2* | 12/2016 | Anderson | G06F 9/3869 |
| 9,984,144 B2* | 5/2018 | Levy | G06F 16/285 |
| 2008/0270751 A1 | 10/2008 | Montvelishsky et al. | |

OTHER PUBLICATIONS

List of IBM Patents or Patent Applications Treated as Related; (Appendix P), Filed Mar. 2, 2018; pp. 1-2.

* cited by examiner

SYSTEM FOR CHANGING RULES FOR DATA PIPLEINE READING USING TRIGGER DATA FROM ONE OR MORE DATA CONNECTION MODULES

DOMESTIC PRIORITY

This application is a continuation of U.S. application Ser. No. 15/355,417, titled "METHOD OF CHANGING RULES FOR DATA PIPELINE READING USING" filed Nov. 18, 2016, the contents of which are incorporated by reference herein in its entirety.

BACKGROUND

Technical Field

The present invention relates to a method of changing rules for reading of a data pipeline by using trigger data.

Related Art

A conventional data pipeline is known to be configured by connecting in series a plurality of components that process data. Furthermore, since it is conventionally necessary to reactivate a data pipeline after a change in the configuration of the data pipeline, the system including this data pipeline must be temporarily stopped at this time. However, there is a need for the configuration of the data pipeline to be changed without stopping the system. If the configuration of a data pipeline is changed, the order for processing the data in each component must be maintained.

SUMMARY

According to one or more embodiments of the present invention, a method of operating a system, a system, and a computer program product are. The system includes a first data processing module, a second data processing module, and one or more data connection modules that transfer data between the first data processing module and the second data processing module. In an operational state where the first data processing module and the second data processing module can process data input thereto, the first data processing module inputs trigger data to any of the one or more data connection modules, and in response to the second data processing module receiving the trigger data via the one or more data connection modules, the second data processing module changes a reading rule for reading data from the one or more data connection modules.

The summary clause does not necessarily describe all necessary features of the embodiments of the present invention. The present invention may also be a sub-combination of the features described above.

DETAILED DESCRIPTION

Hereinafter, some embodiments of the present invention will be described. The embodiments do not limit the invention, and all the combinations of the features described in the embodiments are not necessarily essential to means provided by aspects of the invention.

Figure 1:
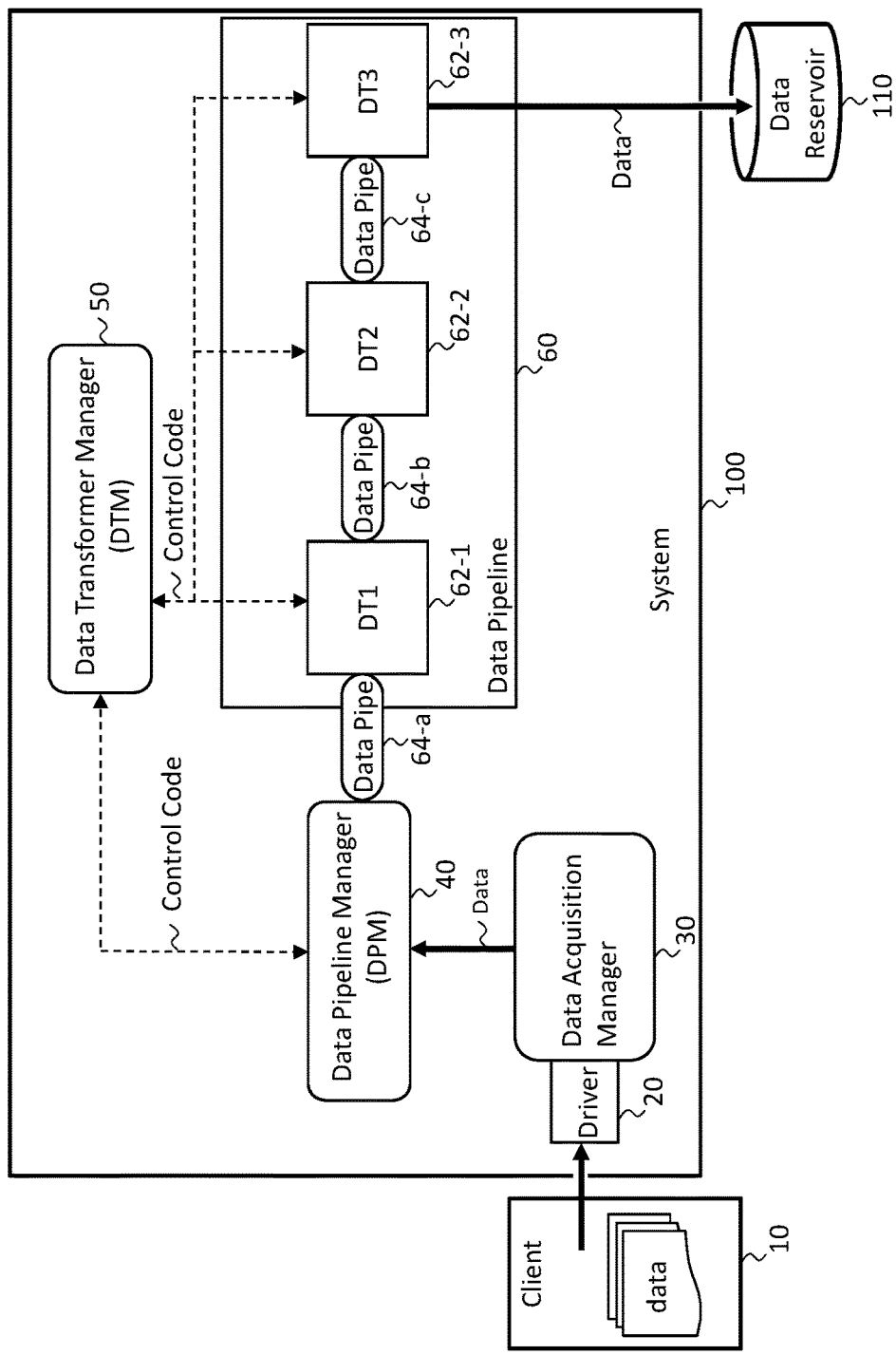
FIG. 1 shows an exemplary configuration of a system according to one or more embodiments.

FIG. 1 shows an exemplary configuration of a system 100 according to an embodiment of the present invention. The system 100 in the present example receives data from a client computer 10, applies a prescribed process to this data, and then stores the processed data in a data accumulating section 110. In FIG. 1, the solid line arrow shows the flow of data that is to be processed or that has been processed, and the dotted line arrow shows the flow of information such as control code.

The system 100 in the present example includes a data acquisition driver 20, a data acquisition manager (DAM) 30, a data pipeline manager (DPM) 40, a data transformer manager (DTM) 50, and a data pipeline 60. The data pipeline 60 may include one or more data pipes 64 and one or more data transformers 62. In FIG. 1, each data transformer 62 is an example of a data processing module and each data pipe 64 is an example of a data connection module.

The data acquisition manager (DAM) 30 may use the data acquisition driver 20 to manage the client computer 10. The data acquisition manager (DAM) 30 in the present example manages connection and communication between the system 100 and the client computer 10, and acquires data from the client computer 10. In one example, the client computer 10 is a computer installed in a medical institution and the data is medical information and patient information sequentially transmitted from the medical institution, but the present invention is not limited to the present example.

The data acquisition manager (DAM) 30 may absorb the difference in data among a plurality of client computers 10. For example, the data acquisition manager (DAM) 30 absorbs protocol differences and/or data format differences among the client computers 10. In this way, the data acquisition manager (DAM) 30 may transform the data acquired from a client computer 10 into data suitable for processing in the data pipeline 60. The data acquisition manager (DAM) 30 may transmit this converted data to the data pipeline manager (DPM) 40.

The data pipeline manager (DPM) 40 may configure the data pipeline 60 based on information contained in the data. The data pipeline 60 may include one or more data transformers 62 and one or more data pipes 64. The data pipeline manager (DPM) 40 may receive the data from the data acquisition manager (DAM) 30.

A path for exchanging information such as control code may be provided between the data pipeline manager (DPM) 40 and the data transformer manager (DTM) 50. A path for exchanging information such as control code may also be provided between the data transformer manager (DTM) 50 and each data transformer (DT) 62. The data pipeline manager (DPM) 40 may output a request for activating one or more of the data transformers (DT) 62 to the data transformer manager (DTM) 50 via this path. In this way, the data pipeline manager (DPM) 40 may create one or more data transformers (DT) 62.

The data transformer manager (DTM) 50 may manage each data transformer (DT) 62. The data transformer manager (DTM) 50 may activate one or more of the data transformers (DT) 62 according to an activation request from the data pipeline manager (DPM) 40. The data transformer manager (DTM) 50 may check the state of the activated data transformers (DT) 62 via the path. Each data transformer (DT) 62 uses middleware such as an IBM® Integration Bus, DataStage®, Apache Hadoop, or Apache Spark, or a custom java code process called Java® Data Transformer.

Each data transformer 62 may be operable to perform a different predetermined process on the data. Each data transformer 62 may be a processing unit for a processing stage in the data pipeline 60. Each data transformer 62 may require a different amount of time to process the data. The data pipeline 60 may sequentially process the data in the data transformers 62.

The data pipeline manager (DPM) 40 may manage the data pipes 64. The data pipeline manager (DPM) 40 may create the necessary data pipes 64 and delete the unnecessary data pipes 64. Each data pipe 64 may be a logical connection between data transformers (DT) 62. Each data pipe 64 may be realized by a WebSphere MQ or Apache Kafka queue, or may be realized by TCP/IP. Each data pipe 64 may be operable to operate according to the FIFO (First In First Out) operational principle. Each data pipe 64 may be operable to transfer data from one data transformer 62 (or the data pipeline manager (DPM) 40) to another data transformer 62 that is adjacent thereto.

After activation of all of the data transformers (DT) 62 forming the data pipeline 60 has been completed, the data pipeline manager (DPM) 40 may transmit the data to the data pipeline 60. A data transformer (DT1) 62-1 that performs the first process in the data pipeline 60 may receive the data from the data pipeline manager (DPM) 40 via a data pipe 64-*a*. The data pipe 64-*a* may also be created or deleted by the data pipeline manager (DPM) 40.

After the data transformer (DTI) 62-1 has performed the prescribed process, a data transformer (DT2) 62-2 may receive the data from the data transformer (DT1) 62-1 via a data pipe 64-*b*. In this way, each data transformer (DT) 62 may sequentially perform the prescribed processes on the data.

The data pipeline 60 in the present example includes three data transformers (DT) 62. The data pipeline 60 in the present example processes the data in the order of the data transformer (DTI) 62-1, the data transformer (DT2) 62-2, and a data transformer (DT3) 62-3. However, it should be noted that the number of data transformers 62 included in the data pipeline 60 is not limited to three. The number of data transformers 62 may be greater than or equal to one.

In the present example, the data acquisition manager (DAM) 30, the data pipeline manager (DPM) 40, the data transformer manager (DTM) 50, the data transformers (DT) 62, and the data pipes 64 are all provided in the same computer (e.g., the same system 100), but one or more of these components may instead be provided in a different computer, or each of these components may be provided in a different computer. Furthermore, the data pipeline manager (DPM) 40 and one or more of the data transformers (DT) 62 may be provided in different computers. The one or more computers may be provided by a cloud environment. The one or more computers may be servers. The computers may be connected to each other by a network. In this case, the data pipes 64 can be suitably connected to the data transformers (DT) 62 in order to form the data pipeline 60.

If a time interval during which the data is input from the data pipeline manager (DPM) 40 to the data pipeline 60 is sufficiently longer than a processing time (referred to hereinafter as the longest processing time) of the data transformer (DT) 62 that requires the longest processing time, a data backlog does not occur in the data pipeline 60. Furthermore, if the time interval during which the data is input from the data pipeline manager (DPM) 40 to the data pipeline 60 becomes shorter than the longest processing time of the data transformers (DT) 62 thereby being defined as temporary, the data pipes 64 can absorb this temporary effect, and therefore, in the same manner, a data backlog does not occur.

However, when the time interval during which data is input from the data pipeline manager (DPM) 40 to the data pipeline 60 is continuously shorter than the longest processing time of the data transformers (DT) 62 (i.e., not temporary), the data pipes 64 cannot absorb this effect. As a result, a data backlog occurs in the data transformer (DT) 62 having the longest processing time. When the input of data to the data pipeline 60 continues despite this data backlog, the data pipe 64 that supplies data to the data transformer (DT) 62 having the longest processing time becomes saturated, i.e., it becomes impossible to input data into this data pipe 64.

Furthermore, the data transformer (DT) 62 positioned immediately before the data transformer (DT) 62 having the longest processing time becomes unable to input the processed data into the data pipe 64 connecting this data transformer (DT) 62 to the data transformer (DT) 62 having the longest processing time. Therefore, the processing by the data transformer (DT) 62 positioned immediately before the data transformer (DT) 62 having the longest processing time is blocked. In this way, the data backlog propagates to the data transformers (DT) 62 and data pipes 64 at early-stages as time passes, so that ultimately the data acquisition manager (DAM) 30 becomes unable to input data into the data pipeline manager (DPM) 40. As a result, the data processing by the system 100 is put on hold.

Figure 2A:
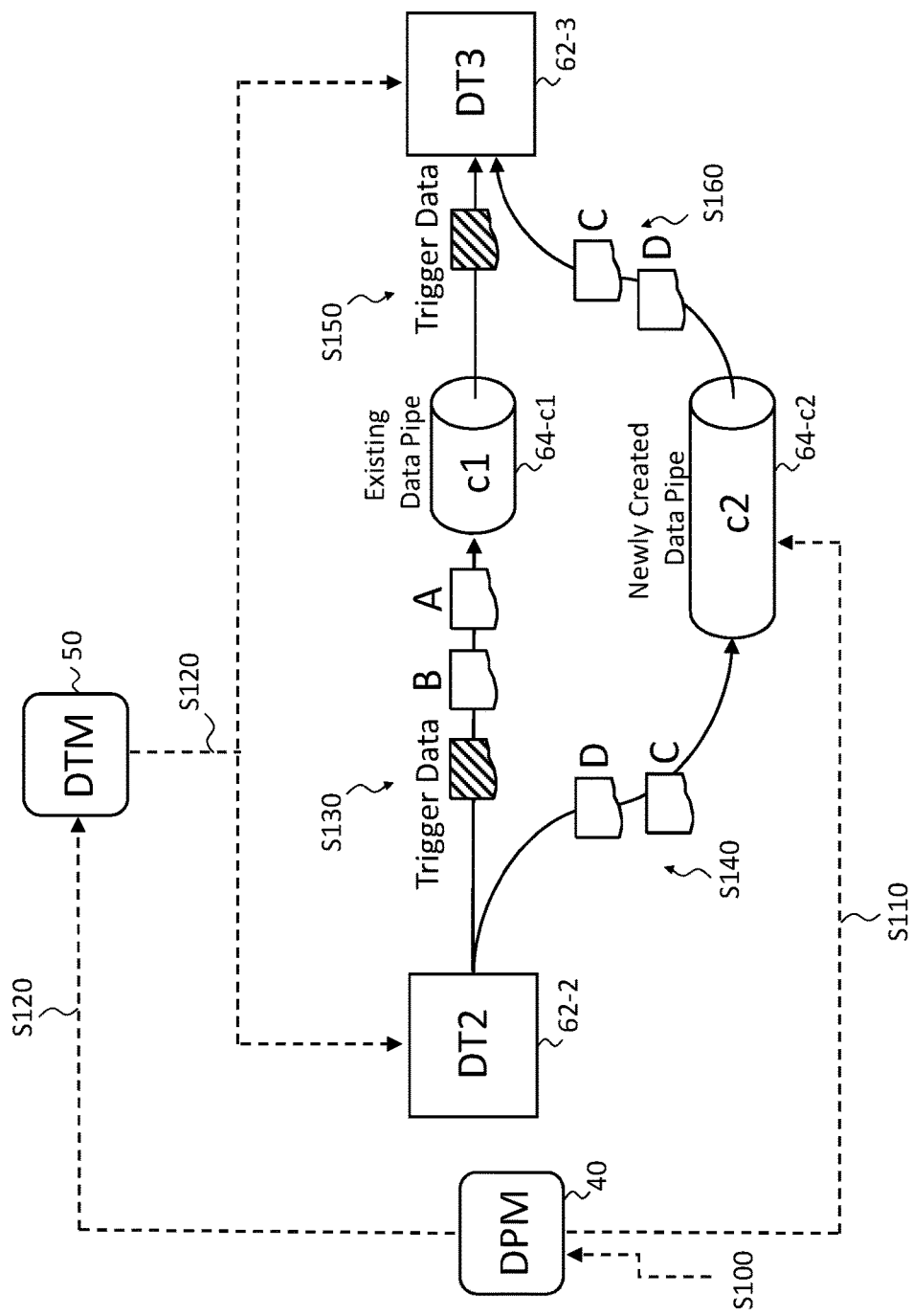
FIG. 2A shows a change of the rules for reading according to one or more embodiments.

FIG. 2A shows a change of the rule for reading according to one or more embodiments. Although not shown, FIG. 2A can include the elements of the system in 100 FIG. 1 along with modifications discussed below. In the present example, the data transformer (DT) 62-3 reads the data from a data pipe 64-*c*1, and then reads the data from a data pipe 64-*c*2 that is different from the data pipe 64-*c*1. The data pipe 64-*c*1 was already provided between the data transformer (DT) 62-2 and the data transformer (DT) 62-3 at the time when the data pipe 60 was configured. The data pipe 64-*c*2 is newly created upon receiving a reading rule change request. In the present example, the data in the data transformers 62 is processed in the order of A, B, C, and D.

In the present example, if the open capacity of the existing data pipe 64-*c*1 has reached a prescribed value, a manager of the system 100 may output the reading rule change request for the data pipes 64 to the data pipeline manager (DPM) 40 (S100).

In response to this request, the data pipeline manager (DPM) 40 may add a new data pipe 64 for transferring data between two data transformers (DT) 62 in parallel with an existing data pipe 64. In response to this request, the data pipeline manager (DPM) 40 in the present example adds the new data pipe 64-*c*2 for transferring data between the data transformer (DT2) 62-2 and the data transformer (DT3) 62-3, in parallel with the existing data pipe 64-*c*1 (S110).

The data pipeline manager (DPM) 40 may add a new data pipe 64 if the data transformer (DT) 62 is in an operational state. The data pipeline manager (DPM) 40 in the present example adds the new data pipe 64-*c*2 if the data transformer (DT2) 62-2 and the data transformer (DT3) 62-3 are in the operational state. The operational state refers to a state in which input data can be processed by the data transformers (DT) 62.

In the present example, after (or in response to) S110, the data pipeline manager (DPM) 40 notifies the data transformer (DT3) 62-3 in advance concerning information relating to the new data pipe 64-*c*2, via the data transformer manager (DTM) 50 (S120). The information concerning the new data pipe 64-*c*2 provided in the notification to the data transformer (DT3) 62-3 may be a reading rule to be used by the data transformer (DT3) 62-3 in response to trigger data if this trigger data is received by the data transformer (DT3) 62-3 via the data pipe 64-*c*2.

In the present example, the trigger data may be pipe-change message data for changing the data pipe 64 through which data is read. Before the data transformer (DT3) 62-3 receives the pipe-change message data, the data transformer (DT3) 62-3 may read the data from the existing data pipe 64-*c*1.

In contrast, after the data transformer (DT3) 62-3 receives the pipe-change message data, the data transformer (DT3) 62-3 may read the data from the newly created data pipe 64-*c*2. In this way, the reading rule may be operable to be changed before and after the data transformer (DT3) 62-3 receives the pipe-change message data.

In the present example, after (or in response to) S110, the data pipeline manager (DPM) 40 notifies the data transformer (DT) 62-2 in advance concerning the information relating to the new data pipe 64-*c*2, via the data transformer manager (DTM) 50 (S120). The information concerning the new data pipe 64-*c*2 provided in the notification to the data transformer (DT2) 62-2 may be a writing rule for writing the data input to by the data transformer (DT2) 62-2 into one or more data pipes 64 after the data transformer (DT2) 62-2 has input the trigger data into the one or more data pipes 64.

The data transformer (DT2) 62-2 in the present example inputs the data (data A and data B in the present example) into the data pipe 64-*c*1, but after the trigger data is input to the data pipe 64-*c*1, the data transformer (DT2) 62-2 inputs the data (data C and data D in the present example) into the data pipe 64-*c*2. In this way, the data transformer (DT2) 62-2 in the present example may be operable to change the writing rule for the data pipes 64 before and after the trigger data is input. The order in which the data is written according to the writing rule of the data transformer (DT2) 62-2 may be the same as the order in which the data is read according to the reading rule of the data transformer (DT3) 62-3. In other words, the writing rule and the reading rule may correspond to each other.

After (or in response to) S120, the data transformer (DT2) 62-2 may input the trigger data into the data pipe 64-*c*1 (S130). If the data transformer (DT2) 62-2 inputs the trigger data into the data pipe 64-*c*1, the data transformer (DT2) 62-2 and the data transformer (DT3) 62-3 may be in the operational state.

The data transformer (DT2) 62-2 may input the trigger data into the existing data pipe 64-*c*1 and, after the trigger data has been input, input the data to the new data pipe 64-*c*2. After the trigger data has been input to the data pipe 64-*c*1, the data transformer (DT2) 62-2 in the present example inputs data C and data D into the data pipe 64-*c*2 (S140).

In response to the data transformer (DT3) 62-3 receiving the trigger data via the data pipe 64-*c*1, the data transformer (DT3) 62-3 may change the reading rule for reading the data from the data pipes 64. The data transformer (DT3) 62-3 in the present example changes the data reading target from the data pipe 64-*c*1 to the data pipe 64-*c*2 (S160) on a condition that the trigger data has been received from the data pipe 64-*c*1 (S150). In this way, the change of the data pipe 64 is ended.

The data transformer (DT3) 62-3 in the present example can change the reading target in the data pipe 64-*c* while sequentially processing the data using a processing thread. In other words, the data transformer (DT3) 62-3 in the present example can read data A and data B and then, without stopping, continue on to sequentially read the trigger data, data C, and data D. In this way, if the reading target in the data pipe 64-*c* is changed, there is no need to stop the operation of the data transformer (DT2) 62-2 and the data transformer (DT3) 62-3. Furthermore, the data transformer (DT3) 62-3 does not need to check whether all of the data stored in the data pipe 64-*c*1 has been read.

If a case were assumed where the data transformer (DT3) 62-3 continues with the data processing while checking the data pipe 64-*c*1 to see whether all of the stored data has been read, the performance of the data transformer (DT3) 62-3 drops, and therefore this approach is not realistic. For example, if the processing time of the data transformer (DT2) 62-2 at an early-stage is longer than the processing time of the data transformer (DT3) 62-3 at a later-stage, there are cases where the data pipe 64-*c*1 temporarily becomes empty. Therefore, although it can be said that the data pipe 64-*c*1 has temporarily become empty, it cannot necessarily be said that the final piece of data stored in the data pipe 64-*c*1 has been read.

In contrast to this, in the present example, the trigger data is used as the final piece of data before the reading target change. Therefore, after reading the trigger data, the data transformer (DT3) 62-3 at the later-stage can judge that there is no more data to be read in the existing data pipe 64-*c*1 and that the following data should be read from the new data pipe 64-*c*2.

In this way, it is possible to maintain the data processing order. The data transformer (DT3) 62-3 in the present example does not read the data from the data pipe 64-*c*2 until the trigger data is read. Therefore, after reading data A and data B in order from the data pipe 64-*c*1, the data transformer (DT3) 62-3 can read data C and data D in order from the data pipe 64-*c*2.

In the system 100 of the present example, the data transformer (DT1) 62-1 for processing data is provided before the data transformer (DT2) 62-2. In this case, it is possible to directly input the trigger data to the existing data pipe 64-*c*1 from the data transformer (DT2) 62-2 toward the data transformer (DT3) 62-3, without having the trigger data pass through the data transformer (DT1) 62-1. It is obvious that one or more existing data pipe 64 may be present.

In this way, the data transformer (DT3) 62-3 that requires the trigger data can receive the trigger data from the data transformer (DT2) 62-2 located immediately before the data transformer (DT3) 62-3. In other words, there is no need for the trigger data to pass through the data transformer (DT2) 62-2, and therefore the data transformer (DT3) 62-3 can receive the trigger data without delay compared to a case where the trigger data is received from the data transformer (DT1) 62-1. In other words, it is possible to immediately change the data pipe 64 without delay from the immediately prior data transformer (DT2) 62-2.

Figure 2B:
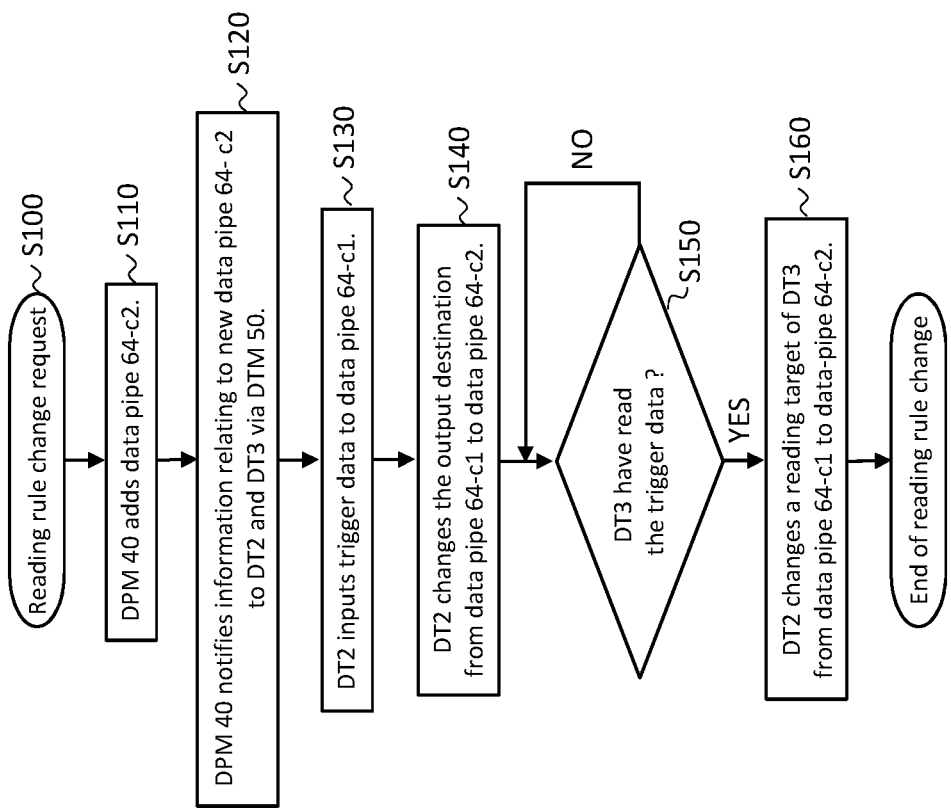
FIG. 2B shows the operational flow of the system according to one or more embodiments.

FIG. 2B shows the operational flow of the system 100 according to the one or more embodiments. In FIG. 2B, the procedures described in FIG. 2A are described using a flow chart. Here, S100 to S160 correspond to S100 to S160 shown in FIG. 2A. Furthermore, S100 to S160 may be performed in the order shown.

The change of a data pipe 64 of the system 100 may be started in response to the data pipeline manager (DPM) 40 receiving a change request for the reading rule of the data pipe 64 (S100). The data pipeline manager (DPM) 40 that has received this request may create a new data pipe 64-c2 (S110).

Information may be provided as a notification to the data transformer (DT2) 62-2 and the data transformer (DT3) 62-3 via the data transformer manager (DTM) 50 (S120). As described above, this information may be a change of the reading rule if the trigger data is received.

The data transformer (DT2) 62-2 may input the trigger data to the data transformer (DT3) 62-3 (S130). After this, the data transformer (DT2) 62-2 may change the output destination from the existing data pipe 64-c1 to the new data pipe 64-c2 (S140).

If the trigger data of S130 is not read (NO at S150), the data transformer (DT3) 62-3 may wait for the arrival of the trigger data from the data transformer (DT2) 62-2. On the other hand, if the trigger data of S130 has been read (YES at S150), the data transformer (DT3) 62-3 may change the reading target from the existing data pipe 64-c1 to the new data pipe 64-c2 (S160).

The above describes an example in which the new data pipe 64-c2 is created for the existing data pipe 64-c1, but two or more data pipes 64-c may be created instead. In other words, three or more data pipes 64 may be provided in parallel. In this case as well, it is possible to apply the reading rule change described above. Furthermore, the data pipe creation is not limited to the data pipe 64-c, and new data pipes 64 may be newly created in parallel with any data pipe 64 (e.g., such as in parallel with data pipe 64-a, data pipe 64-b, etc.).

The change of the reading rule for the data is not limited only to the following examples, but it is believed that this change is applied mainly to the four examples described below (for explanation purposes). The first and second examples are examples in which a new data pipe 64 is "created," and the third and fourth examples are examples in which a new data pipe 64 is "not created." It is obvious that these four examples are merely examples, and that the change of the reading rule for the data may be applied to other examples as well. The reading rule for the data may be changed using a combination including any two or more of these four examples. The following description using the data pipe 64-c is intended as a simple description to facilitate understanding, and is not intended to apply any limitations.

In the first example, in the same manner as the example shown in FIG. 2A and FIG. 2B, (i) the data pipe 64-c1 already exists, (ii) the data pipe 64-c2 is newly created, (iii) only the data pipe 64-c1 is used "before" the reading rule change, and (iv) only the data pipe 64-c2 is used "after" the reading rule change. This example is shown in "Table 1."

TABLE 1

| Data Pipe | Before | After |
| --- | --- | --- |
| c1 (existing) | #1, #2, . . . , #6 | — |
| c2 (newly created) | — | #1, #2, . . . , #6 |

In the second example, (i) the data pipe 64-c1 and the data pipe 64-c2 already exist, (ii) the data pipe 64-c3 is newly created, (iii) only the data pipe 64-c1 and the data pipe 64-c2 are used "before" the reading rule change, and (iv) all of the data pipes 64-c1 to 64-c3 are used "after" the reading rule change. This example is shown in "Table 2."

TABLE 2

| Data Pipe | Before | After |
| --- | --- | --- |
| c1 (existing) | #1, #3, #5 | #1, #3 |
| c2 (existing) | #2, #4, #6 | #2, #4 |
| c3 (newly created) | — | #5, #6 |

In the second example, the data transformer (DT3) 62-3 may read the data according to a reading rule that includes one or more existing data pipes 64 (i.e., the data pipe 64-c1 and the data pipe 64-c2) and a new data pipe 64 (i.e. the data pipe 64-c3) as the data reading targets, on a condition that trigger data has been read from all of the existing data pipes 64 (i.e., the data pipe 64-c1 and the data pipe 64-c2).

In the third example, (i) the data pipe 64-c1 and the data pipe 64-c2 already exist, (ii) no data pipes 64 are newly created, (iii) only the data pipe 64-c1 is used "before" the reading rule change, and (iv) only the data pipes 64-c2 is used "after" the reading rule change. This example is shown in "Table 3."

TABLE 3

| Data Pipe | Before | After |
| --- | --- | --- |
| c1 (existing) | #1, #2, . . . , #6 | — |
| c2 (existing) | — | #1, #2, . . . , #6 |

In the fourth example, (i) the data pipe 64-c1 and the data pipe 64-c2 already exist, (ii) no data pipes 64 are newly created, (iii) both the data pipe 64-c1 and the data pipe 64-c2 are used "before" the reading rule change, and (iv) both the data pipe 64-c1 and the data pipe 64-c2 are also used "after" the reading rule change. This example is shown in "Table 4."

TABLE 4

| Data Pipe | Before | After |
| --- | --- | --- |
| c1 (existing) | #1, #2, #3 | #1, #2 |
| c2 (existing) | #4, #5, #6 | #3, #4, #5, #6 |

Figure 3A:
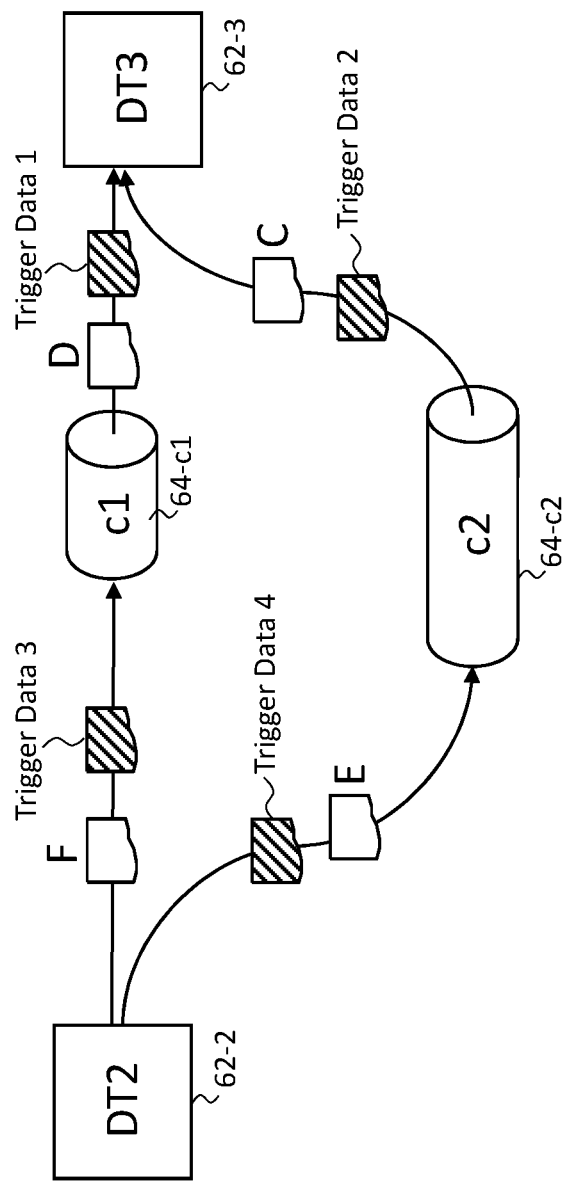
FIG. 3A shows a first modification of a change of the reading rules according to one or more embodiments.

FIG. 3A shows a first modification of a change of the reading rules according to one or more embodiments. In the present example, two data pipes 64-c1 and 64-c2 read data from each other. The data pipe 64-c2 may be existing or may be newly created.

The data transformer (DT3) 62-3 can change to the data pipe 64-c being read every time trigger data is received. The data transformer (DT3) 62-3 in the present example can change the order in which the data is read to be: trigger data 1→data C→trigger data 2→data D→trigger data 3→data E→trigger data 4→data F.

Figure 3B:
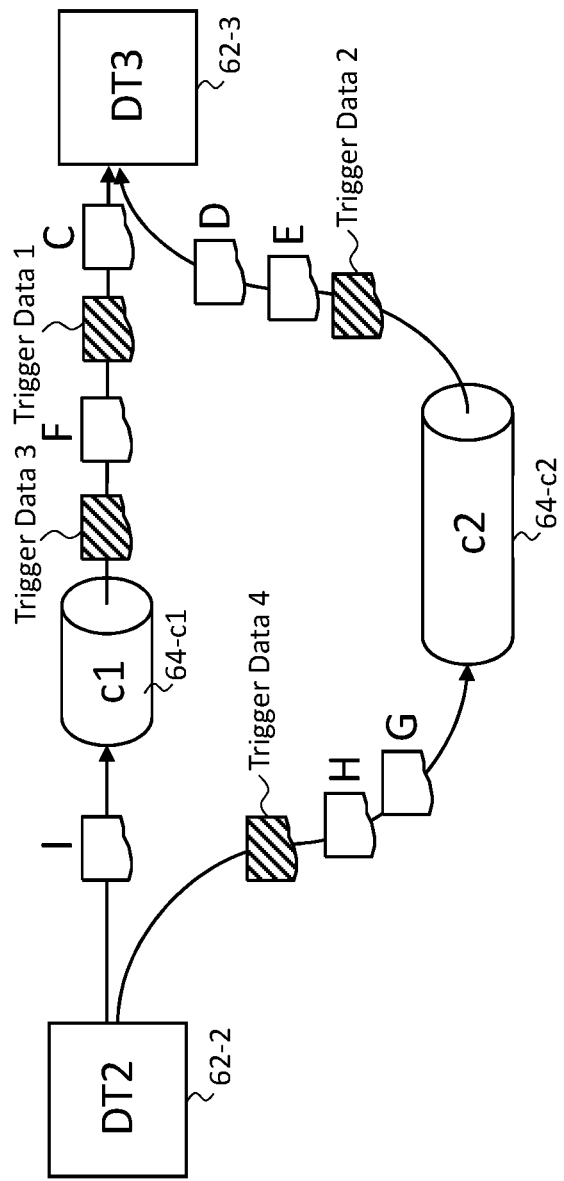
FIG. 3B shows a second modification of a change of the reading rules according to one or more embodiments.

FIG. 3B shows a second modification of a change of the reading rules according to one or more embodiments. In the present example, a ratio of 1:2 is set for the ratio of the data read from the data pipe 64-*c*1 to the data read from the data pipe 64-*c*2. The read data ratio may refer to the ratio of the number of end-of-data partitions attached to the read data. This point differs from the first modification described above. The data transformer (DT3) 62-3 in the present example can change the order in which the data is read to be: data C→trigger data 1→data D and data E→trigger data 2→data F→trigger data 3→data G and data H→trigger data 4→data I. In the present example, the data pipe 64-*c*2 may have twice the capacity of the data pipe 64-*c*1.

In addition to the above, one or more embodiments of the present invention may be modified as described below.

As a third modification, the data pipeline manager (DPM) 40 may determine whether to add a new data pipe 64 based on the amount of data accumulated in one or more existing data pipes 64. For example, the data pipeline manager (DPM) 40 adds a new data pipe 64 if the usage rate of a data pipe 64 during a prescribed time (i.e., the average value of the usage rate over a prescribed time) exceeds a prescribed value.

The prescribed value for the usage rate during the prescribed time may be defined by a plurality of values. If the prescribed value is a relatively high first value, the data pipeline manager (DPM) 40 may newly create a data pipe 64 with a greater capacity than the existing data pipe 64. On the other hand, if the prescribed value for the usage rate is a relatively low second value, the data pipeline manager (DPM) 40 may newly create a data pipe 64 with a smaller capacity than the existing data pipe 64.

A data pipe 64 may be created by using a memory region in a non-volatile memory provided in the system 100. Therefore, if the capacity of the data pipe 64 is set to be low, the usage rate of the memory region can be lowered. Accordingly, by adjusting the capacity of the data pipe 64 as needed, expenditure of memory resources can be prevented.

The component that actually performs the addition, deletion, maintenance, and control of the data pipes 64 is the data pipeline manager (DPM) 40, but the component that makes judgments concerning the addition, deletion, maintenance, and control of the data pipes 64 may be the data acquisition manager (DAM) 30 and/or the data transformer manager (DTM) 50.

As a fourth modification, the data pipeline manager (DPM) 40 may determine whether to add a new data pipe 64 based on the data input to a data transformer (DT) 62. For example, the data pipeline manager (DPM) 40 may judge that a new data pipe 64 is not to be created if relatively light text data is input to the data transformer (DT) 62. On the other hand, the data pipeline manager (DPM) 40 may judge that a new data pipe 64 is to be created if relatively heavy image data or moving image data is input to the data transformer (DT) 62.

As a fifth modification, the data pipeline manager (DPM) 40 may control the data capacity of a new data pipe 64 based on the data input to the data acquisition driver 20, if a new data pipe 64 is created based on the data input to the data transformer 62. The data capacity of the data pipe 64 may be the queue depth if the data pipe 64 is a queue.

As a sixth modification, the data pipeline manager (DPM) 40 may control the type of new data pipe 64 based on the data input to the data transformer 62, if a new data pipe 64 is created based on the data input to the data transformer 62. The type of the data pipe 64 may be classified according to the queue depth. The data pipeline manager (DPM) 40 may select one type of data pipe 64 from among WebSphere and Apache Kafka, which have a queue depth of two or more, and TCP/IP, which has a queue depth of one.

As a seventh modification, in the example of FIG. 2A, the information concerning the reading rule is provided as notification by the data pipeline manager (DPM) 40 to a data transformer (DT) 62 via the data transformer manager (DTM) 50, but the data transformer (DT) 62 may input trigger data including the information concerning the reading rule to one or more data pipes 64. In this way, the information concerning the reading rule may be handled just by a plurality of the data transformers (DT) 62, without having this information pass through the data pipeline manager (DPM) 40 and the data transformer manager (DTM) 50.

Figure 4A:
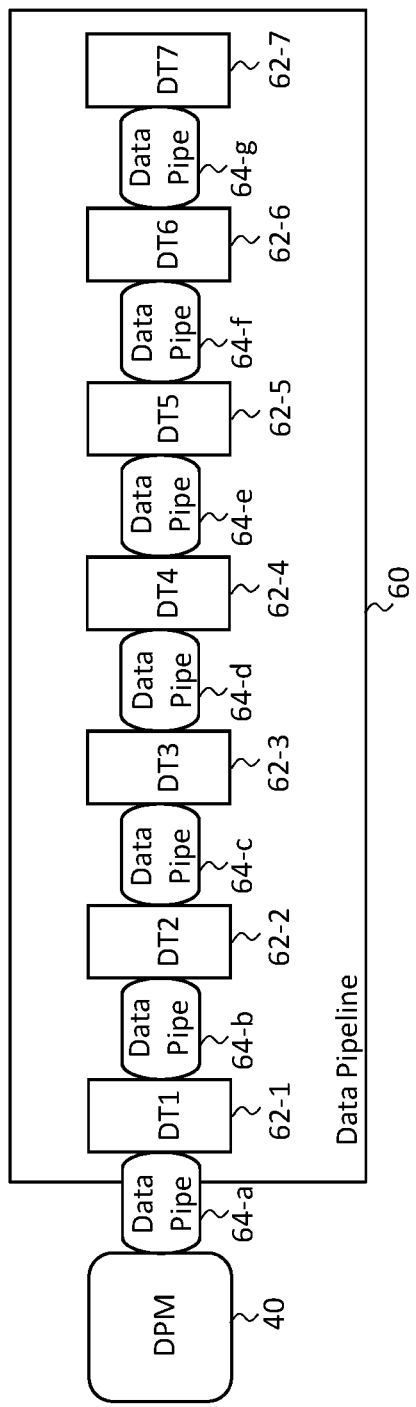
FIG. 4A shows a data pipeline according to a first experimental example according to one or more embodiments.

According to one or more embodiments, FIG. 4A shows a data pipeline 60 according to a first experimental example. In this experimental example, the experimental data pipeline 60 was configured by connecting seven data transformers (DT) 62 in series.

The data pipe 64-*a* is a data pipe 64 that supplies data to the data transformer (DT1) 62-1 from the data pipeline manager (DPM) 40. In the same manner, the data pipes 64-*b*, 64-*c*, 64-*d*, and 64-*e* are data pipes 64 that respectively supply data to the data transformers (DT2) 62-2, (DT3) 62-3, (DT4) 62-4, and (DT5) 62-5.

The processing time of each data transformer (DT) 62 forming the data pipeline 60 of the first experimental example was set to be the same as the average processing time of the data transformers (DT) 62 as measured in an integration test using the cloud environment. The processing time of each data transformer (DT) 62 in the experimental example is shown in "Table 5."

TABLE 5

| DT Identifier | Processing Time (msec) |
|---|---|
| DT1 | 20 |
| DT2 | 7 |
| DT3 | 168 |
| DT4 | 300 |
| DT5 | 4,651 |
| DT6 | 20 |
| DT7 | 16 |

The data was input to the leading data transformer (DT1) 62-1 using a REST API provided by the data pipeline manager (DPM) 40. The data being processed was HL7 (Health Level Seven) message data, and the unit length of this data was 1,648 bytes. This data was input to the leading data transformer (DT1) 62-1 one piece at a time at intervals of approximately 1 second. A total of 200 pieces of data were input. A curl command was used to call up the REST API. The execution time of the REST API was used as the elapsed time.

The WebSphere MQ was used as the data pipes 64. The queue depth was 20. In other words, the data pipes 64 were set in a manner to be able to queue up to 20 units of the message data. In this way, the state of the data backlog was checked.

Figure 4B:
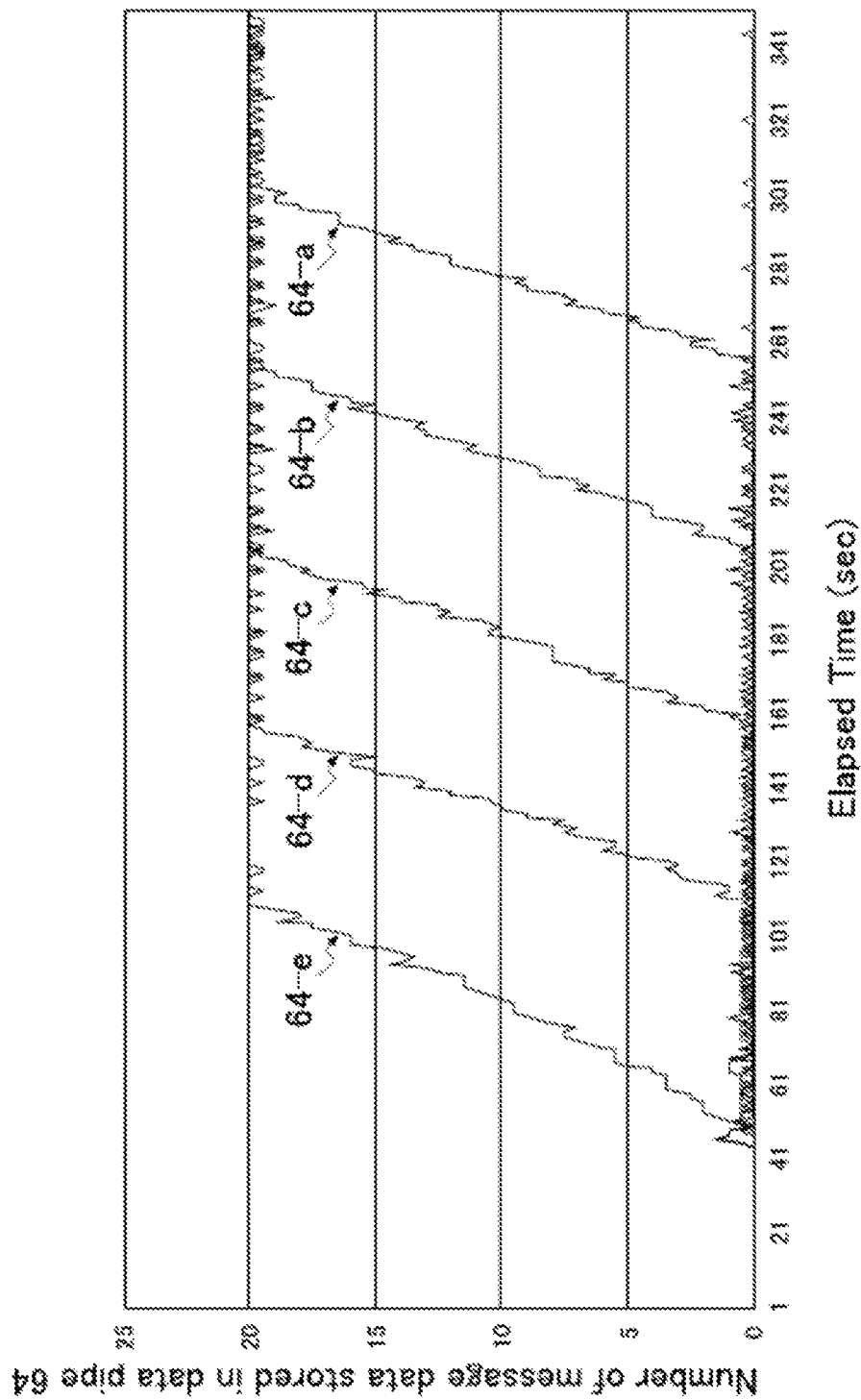
FIG. 4B shows changes in the number of pieces of data in the data pipes in a case where the reading rule is not changed according to the first experimental example in accordance with one or more embodiments.

FIG. 4B shows changes in the number of pieces of data in the data pipes 64 in a case where the reading rule is not changed, according to the first experimental example. The horizontal axis indicates the elapsed time (seconds) and the vertical axis indicates the number of pieces of message data input to the data pipes 64 (i.e., the number of pieces of data queued).

In the first experimental example, approximately 41 seconds after the start of the data input to the data pipeline 60, a data backlog occurred in the data pipe 64-*e*, which is the data pipe 64 connecting the data transformer (DT4) 62-4 and the data transformer (DT5) 62-5. Along with the passage of time, the data backlog propagated to the data pipes 64-*d*, 64-*c*, 64-*b*, and 64-*a* that are at earlier-stages than the data pipe 64-*e*. At 310 seconds, the data queues of the five data pipes 64 from the data pipe 64-*e* to the data pipe 64-*a* were full. In this way, it was confirmed that if the reading rule is not changed, the data backlog in the data pipe 64-*e* propagates back to the data pipe 64-*a* positioned at the earliest-stage.

Figure 4C:
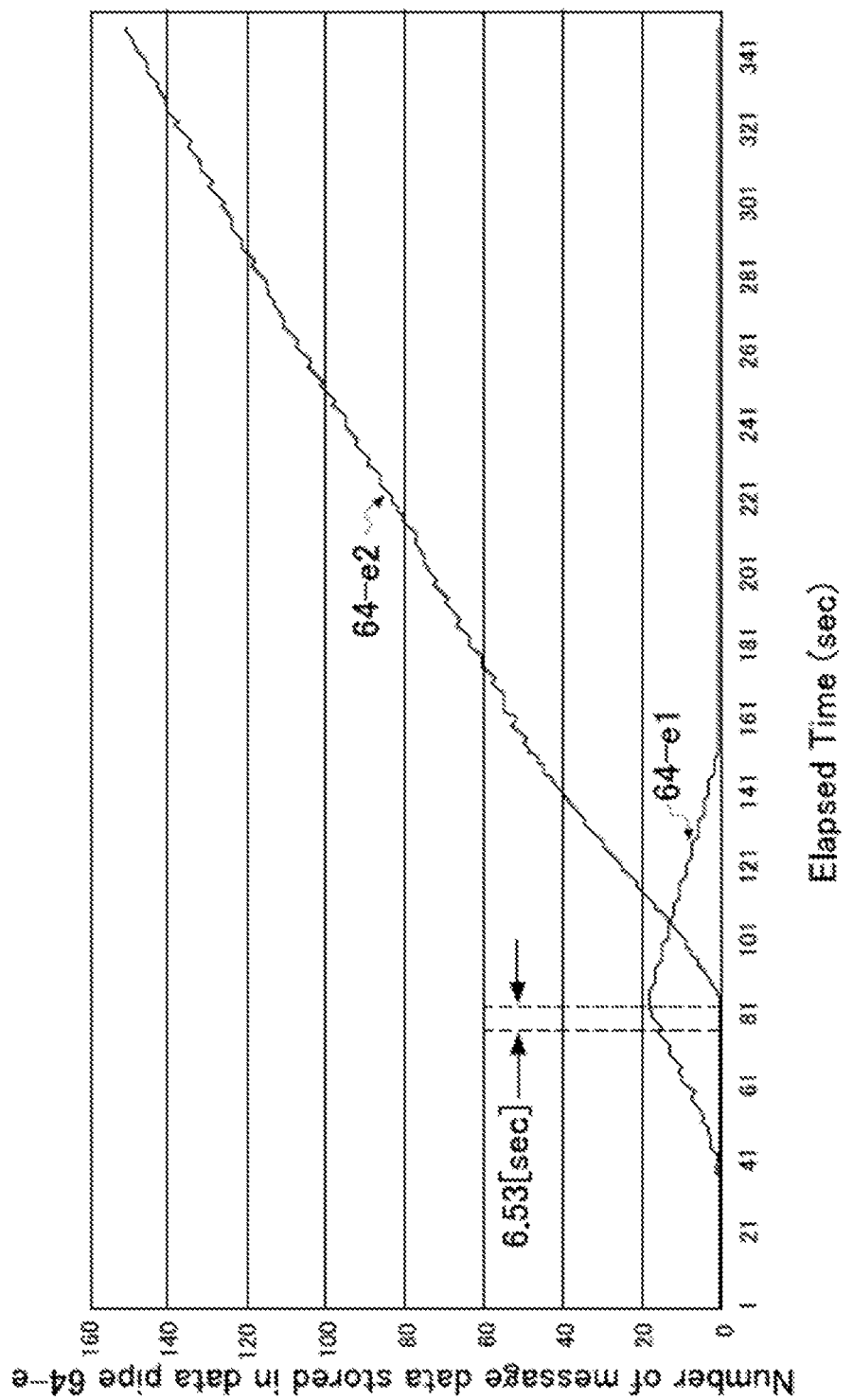
FIG. 4C shows changes in the number of pieces of data in the data pipes in a case where the reading rule is changed according to a second experimental example in accordance with one or more embodiments.

According to one or more embodiments, FIG. 4C shows changes in the number of pieces of data in the data pipes 64 in a case where the reading rule is changed, according to a second experimental example. In the second experimental example, only the point of changing the reading rule differs from the first experimental example, and all other conditions are the same as in the first experimental example.

In the second experimental example, the number of pieces of data queued in the data pipe 64-*e* that supplies the data to the data transformer (DT5) 62-5 was monitored. At the timing when 80% (20×0.8=16) of the capacity was reached, a data pipe 64-*e*2 with a queue depth of 1,000 was newly created (it should be noted that the existing data pipes 64 are displayed separately from the data pipe 64-*e*1). Furthermore, the trigger data was input to the data transformer (DT5) 62-5. The data transformer (DT5) 62-5 that read the trigger data changed the reading target from the data pipe 64-*e*1 with a queue depth of 20 to the data pipe 64-*e*2 with a queue depth of 1,000.

The time from when the data pipe 64-*e*2 was created to when the first piece of data was input to the data pipe 64-*e*2 was 6.53 seconds. Furthermore, after 150 seconds passed from when the data was input to the data pipe 64-*e*2, the switching of the reading target from the data pipe 64-*e*1 to the data pipe 64-*e*2 was completed. In addition, by checking the data dump from the data transformer (DT7) 62-7, it was confirmed that the data order was maintained without the input data overtaking earlier data in the data pipeline 60.

Figure 5:
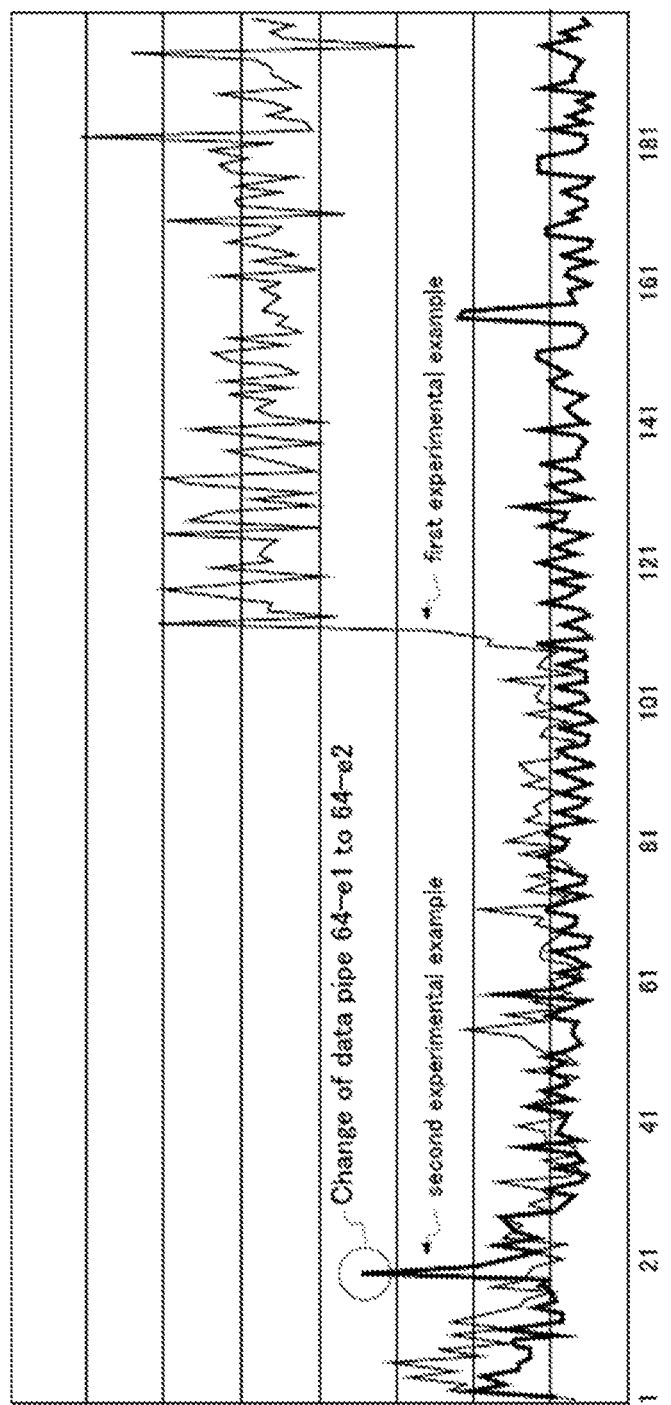
FIG. 5 shows the time needed for the data to be input to the data pipe according to the first and second experimental examples in accordance with one or more embodiments.

FIG. 5 shows the time needed for the data to be input to the data pipe 64-*e*, according to the first and second experimental examples. The horizontal axis indicates the total number of pieces of message data input to the data pipe 64-*e*, and the vertical axis indicates the time (seconds) needed to input one piece of message data into the data pipe 64-*e*. The thin line indicates the first experimental example, and the thick line indicates the second experimental example.

In the second experimental example (the example where the reading rule is changed), the time needed to input the $20^{th}$ piece of message data into the data pipe 64 was particularly long. This is because the creation of the new data pipe 64-*e*2 by the data pipeline manager (DPM) 40 (S110) and the notification about the information concerning the reading rule provided to the data transformer (DT4) 62-4 and the data transformer (DT5) 62-5 (S120) are performed exclusively, and therefore the input of message data to the data pipe 64 is blocked.

In the first experimental example (the example where the reading rule is not changed), an average time of 4.78 was required to input each piece of message data after the $113^{th}$ piece of data. In other words, it became difficult to input the message data into the data pipes 64, and the processing performance of the data pipes 64 dropped. In contrast to this, in the second experimental example (the example where the reading rule is changed according to one or more embodiments), the average time needed to input a piece of data was 0.86 seconds even after the $113^{th}$ piece of message data was input. In other words, with the second experimental example, it was possible to stably input data into the data pipes 64 with a time interval that is less than or equal to 20% of the time interval needed with the first experimental example.

Figure 6:
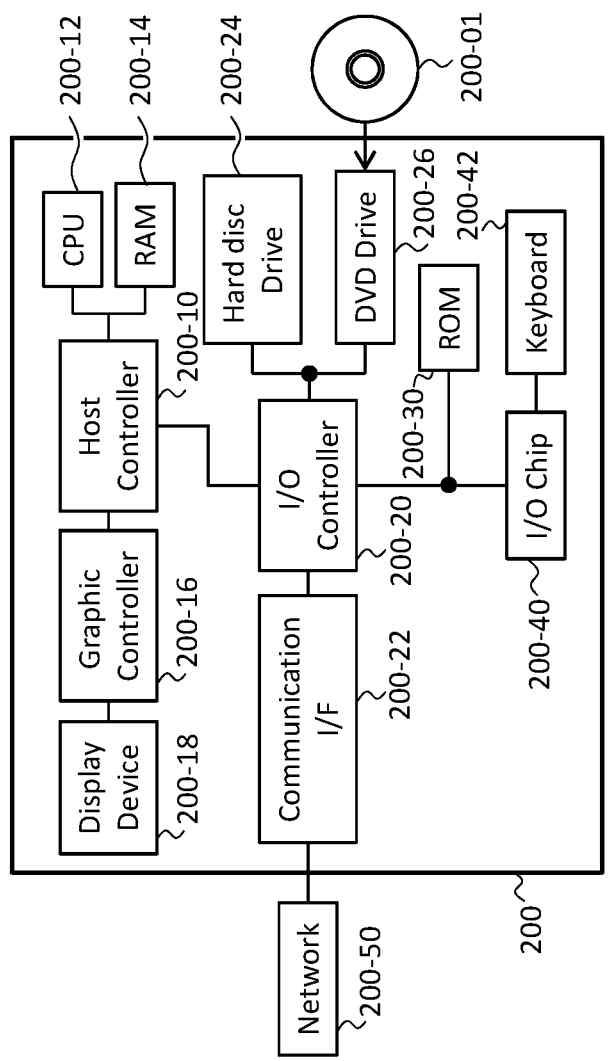
FIG. 6 shows an exemplary hardware configuration of a computer 200 configured for cloud service utilization, according to an embodiment of the present invention.

FIG. 6 shows an exemplary hardware configuration of a computer configured for cloud service utilization, according to an embodiment of the present invention. A program that is installed in the computer 200 can cause the computer 200 to function as or perform operations associated with apparatuses of the embodiments of the present invention or one or more sections (including modules, components, elements, etc.) thereof, and/or cause the computer 200 to perform processes of the embodiments of the present invention or steps thereof. Such a program may be executed by the CPU 200-12 to cause the computer 200 to perform certain operations associated with some or all of the blocks of flowcharts and block diagrams described herein.

The computer 200 according to the present embodiment includes a CPU 200-12, a RAM 200-14, a graphics controller 200-16, and a display device 200-18, which are mutually connected by a host controller 200-10. The computer 200 also includes input/output units such as a communication interface 200-22, a hard disk drive 200-24, a DVD-ROM drive 200-26 and an IC card drive, which are connected to the host controller 200-10 via an input/output controller 200-20. The computer also includes legacy input/output units such as a ROM 200-30 and a keyboard 200-42, which are connected to the input/output controller 200-20 through an input/output chip 200-40.

The CPU 200-12 operates according to programs stored in the ROM 200-30 and the RAM 200-14, thereby controlling each unit. The graphics controller 200-16 obtains image data generated by the CPU 200-12 on a frame buffer or the like provided in the RAM 200-14 or in itself, and causes the image data to be displayed on the display device 200-18.

The communication interface 200-22 communicates with other electronic devices via a network 200-50. The hard disk drive 200-24 stores programs and data used by the CPU 200-12 within the computer 200. The DVD-ROM drive 200-26 reads the programs or the data from the DVD-ROM 200-01, and provides the hard disk drive 200-24 with the programs or the data via the RAM 200-14. The IC card drive reads programs and data from an IC card, and/or writes programs and data into the IC card.

The ROM 200-30 stores therein a boot program or the like executed by the computer 200 at the time of activation, and/or a program depending on the hardware of the computer 200. The input/output chip 200-40 may also connect various input/output units via a parallel port, a serial port, a keyboard port, a mouse port, and the like to the input/output controller 200-20.

A program is provided by computer readable media such as the DVD-ROM 200-01 or the IC card. The program is read from the computer readable media, installed into the hard disk drive 200-24, RAM 200-14, or ROM 200-30, which are also examples of computer readable media, and executed by the CPU 200-12. The information processing described in these programs is read into the computer 200, resulting in cooperation between a program and the above-mentioned various types of hardware resources. An apparatus or method may be constituted by realizing the operation or processing of information in accordance with the usage of the computer 200.

For example, when communication is performed between the computer 200 and an external device, the CPU 200-12 may execute a communication program loaded onto the RAM 200-14 to instruct communication processing to the communication interface 200-22, based on the processing described in the communication program. The communication interface 200-22, under control of the CPU 200-12, reads transmission data stored on a transmission buffering region provided in a recording medium such as the RAM 200-14, the hard disk drive 200-24, the DVD-ROM 200-01, or the IC card, and transmits the read transmission data to network 200-50 or writes reception data received from network 200-50 to a reception buffering region or the like provided on the recording medium.

In addition, the CPU 200-12 may cause all or a necessary portion of a file or a database to be read into the RAM 200-14, the file or the database having been stored in an external recording medium such as the hard disk drive 200-24, the DVD-ROM drive 200-26 (DVD-ROM 200-01), the IC card, etc., and perform various types of processing on the data on the RAM 200-14. The CPU 200-12 may then write back the processed data to the external recording medium.

Various types of information, such as various types of programs, data, tables, and databases, may be stored in the recording medium to undergo information processing. The CPU 200-12 may perform various types of processing on the data read from the RAM 200-14, which includes various types of operations, processing of information, condition judging, conditional branch, unconditional branch, search/replace of information, etc., as described throughout this disclosure and designated by an instruction sequence of programs, and writes the result back to the RAM 200-14. In addition, the CPU 200-12 may search for information in a file, a database, etc., in the recording medium. For example, when a plurality of entries, each having an attribute value of a first attribute is associated with an attribute value of a second attribute, are stored in the recording medium, the CPU 200-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 200. In addition, a recording medium such as a hard disk or a RAM provided in a server system connected to a dedicated communication network or the Internet can be used as the computer readable media, thereby providing the program to the computer 200 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to change the reading rule for a data pipeline by using trigger data.

What is claimed is:

1. A method of operating a system, the system including a first data processing module, a second data processing module, and one or more data connection modules that transfer data between the first data processing module and the second data processing module, the method comprising:
   in an operational state where the first data processing module and the second data processing module can process data input thereto, inputting by the first data processing module trigger data to any of the one or more data connection modules; and
   in response to the second data processing module receiving the trigger data via the one or more data connection modules, changing by the second data processing module a reading rule for reading data from the one or more data connection modules;
   wherein an early-stage data processing module that processes data is provided in the system before the first data processing module; and
   wherein the trigger data is input to the one or more data connection modules form the first data processing module, without passing through the early-stage data processing module.

2. The method according to claim 1, wherein before the second data processing module receives the trigger data via the one or more data connection modules, the second data processing module is informed in advance concerning the reading rule to be used by the second data processing module in response to the trigger data.

3. The method according to claim 2, wherein after the first data processing module has input the trigger data to the one or more data connection modules, the first data processing module changes a writing rule for writing data to the one or more data connection modules.

4. A method of operating a system, the system including a first data processing module, a second data processing module, and one or more data connection modules that transfer data between the first data processing module and the second data processing module, the method comprising:
   in an operational state where the first data processing module and the second data processing module can process data input thereto, inputting by the first data processing module trigger data to any of the one or more data connection modules;
   in response to the second data processing module receiving the trigger data via the one or more data connection modules, changing by the second data processing module a reading rule for reading data from the one or more data connection modules;
   in response to the first data processing module being in the operational state, a new data connection module that transfers data between the first data processing module and the second data processing module is added to the one or more existing data connection modules;
   the first data processing module inputs the trigger data to the one or more existing data connection modules, and in response to the trigger data having been input, inputs data to the new data connection module; and
   the second data processing module reads the data according to the reading rule including the new data connection module as a data reading target, on a condition that the second data processing module has read the trigger data from all of the one or more existing data connection modules.

5. The method according to claim 4, wherein whether or not to add the new data connection module is determined based on an amount of data accumulated in the one or more existing data connection modules.

6. The method according to claim 4, wherein whether or not to add the new data connection module is determined based on the data input to the first data processing module.

7. The method according to claim 6, wherein if the new data connection module is created based on the data input to the first data processing module, data capacity of the new data connection module is controlled based on data input to a driver of the system.

8. The method according to claim 6, wherein if the new data connection module is created based on the data input to the first data processing module, a type of the new data connection module is controlled based on the data input to the first data processing module.

9. The method according to claim 1, wherein the first data processing module inputs the trigger data including information concerning the reading rule to the one or more data connection modules.

\* \* \* \* \*